US006405170B1

United States Patent
Phillips et al.

(10) Patent No.: US 6,405,170 B1
(45) Date of Patent: Jun. 11, 2002

(54) METHOD AND SYSTEM OF REVIEWING THE BEHAVIOR OF AN INTERACTIVE SPEECH RECOGNITION APPLICATION

(75) Inventors: Michael S. Phillips, Belmont; Mark A. Fanty, Norfolk; Krishna K. Govindarajan, Somerville, all of MA (US)

(73) Assignee: SpeechWorks International, Inc., Boston, MA (US)

( * ) Notice: Subject to any disclaimer, the term of this patent is extended or adjusted under 35 U.S.C. 154(b) by 0 days.

(21) Appl. No.: 09/159,272

(22) Filed: Sep. 22, 1998

(51) Int. Cl.[7] .............................................. G10L 21/00
(52) U.S. Cl. ..................... 704/270; 704/275; 379/88.02
(58) Field of Search ................................ 704/270, 275, 704/218; 379/88.02; 345/418

(56) References Cited

U.S. PATENT DOCUMENTS

| | | | | |
|---|---|---|---|---|
| 5,294,229 A | * | 3/1994 | Hartzell et al. | 434/336 |
| 5,317,732 A | * | 5/1994 | Gerlach, Jr. et al. | 707/104 |
| 5,367,609 A | * | 11/1994 | Hopper et al. | 704/278 |
| 5,495,522 A | * | 2/1996 | Allen et al. | 379/202 |
| 5,574,843 A | * | 11/1996 | Gerlach, Jr. | 345/418 |
| 5,581,600 A | * | 12/1996 | Watts et al. | 379/88.02 |
| 5,812,533 A | * | 9/1998 | Cox et al. | 370/259 |
| 6,219,643 B1 | | 4/2001 | Cohen et al. | |

* cited by examiner

Primary Examiner—Fan Tsang
Assistant Examiner—Michael N. Opsasnick
(74) Attorney, Agent, or Firm—Hale and Dorr LLP

(57) ABSTRACT

A method and apparatus are provided for improving the performance of an interactive speech application. The interactive speech application is developed and deployed for use by one or more callers. During execution, the interactive speech application stores, in a log, event information that describes each task carried out by the interactive speech application in response to interaction with the one or more callers. The application also stores one or more sets of audio information, in which each of the sets of audio information is associated with one or more utterances by one of the callers. Each of the sets of audio information is associated with one of the tasks represented in the log. After the log is established, an analytical report is displayed. The report describes selective actions taken by the interactive speech application while executing, and selective actions taken by one or more callers while interacting with the interactive speech application. Information in the analytical report is selected so as to identify one or more potential performance problems in the interactive speech application. While the analytical report is displayed, when the analytical report reaches a point at which the audio information was previously recorded and stored, the audio information may be replayed and analyzed. The interactive speech application is modified based on the analytical report. Accordingly, the interactive speech application may be improved based upon its actual performance, and its actual performance may be evaluated in detail based on specific call events and caller responses to application actions.

22 Claims, 8 Drawing Sheets

METHOD AND SYSTEM OF REVIEWING THE BEHAVIOR OF AN INTERACTIVE SPEECH RECOGNITION APPLICATION

FIELD OF THE INVENTION

The present invention relates to computer software. The invention relates more specifically to approaches for improving the performance of interactive speech applications.

BACKGROUND OF THE INVENTION

Computer-based interactive speech applications provide automated interactive communications. For example, a computer-based interactive speech application may be used in a telephone system to automatically answer an incoming call and engage in a dialogue with the caller in order to route the call, provide requested information, or process a transaction. Using speech recognition technology, the application is able to convert a caller's speech into a textual representation and thereby understand what the caller is saying. These applications are also sometimes categorized under the general heading of interactive voice response (IVR) applications. Where they involve the use of speech recognition technology, these applications are defined here under the more narrow term, "interactive speech applications".

In the past, developing interactive speech response applications that use speech recognition technology has been difficult for the enterprises that implement these applications, their programmers, and others. The software development tools and application testing tools available for use in the development process have been less than satisfactory. One recent significant improvement in the development process involves the use of re-usable software components, commercially known as DialogModules™, that a developer may interconnect to produce effective speech applications quickly. This modular approach is described in co-pending U.S. patent application Ser. No. 09/081,719, filed May 6, 1998, entitled "System and Method for Developing Interactive Speech Applications."

Although the modular approach represents a significant advance in the development process, there is still a need for an effective way to determine whether a completed interactive speech application is working effectively. Generally, a developer or programmer prepares an interactive speech application by hand-writing source code, assembling pre-defined objects, or joining modular components using a system such as DialogModules™. The developer compiles the program, installs it on a test system, and verifies that it operates correctly in response to test telephone calls. The program may be debugged and rewritten over a period of time. The completed application is then launched and used on a "live" basis.

Even though a completed application operates correctly, meaning that there are no errors in the program code, it may not perform in an optimal manner in a live environment. Detecting performance problems is difficult. Performance problems include a variety of issues or defects, such as the inability of repeated callers to understand a particular prompt or option, callers becoming "lost" in the logical flow of the application, etc. In the past, developers have received feedback on such problems in a manual way, such as by callers calling an institution to complain about its voice response system.

Thus, there is a need for an automated way to provide feedback on the usability or effectiveness of a completed application.

In addition, there is a need for tools that can be used to identify potential problems with particular components of an application, such as vocabulary, prompts, and call flow.

There is also a need for a mechanism for tuning an application based on its past performance.

There is a further need for a mechanism for improving performance of an application, in which audible prompts and actual caller utterances may be reviewed in conjunction with events that caused such utterances.

SUMMARY OF THE INVENTION

The foregoing needs, and other needs and objects that will become apparent from the following description, are fulfilled by the present invention, which comprises, in one aspect, a method of improving performance of an interactive speech application. Generally, the method involves the computer-implemented steps of storing in a log, event information that describes each task carried out by the interactive speech application in response to interaction with one or more callers; displaying an analytical report about selective actions taken by the interactive speech application while executing and about selective actions taken by one or more callers while interacting with the interactive speech application; and modifying the interactive speech application based on the analytical report.

In one feature of this aspect, displaying an analytical report further comprises retrieving a portion of the event information that is associated with a particular call within the log; and for each event represented in the portion of the event information, identifying an event and reporting analytical information concerning the event.

According to another feature, retrieving a portion of the event information comprises receiving a call number that identifies the particular call and skipping over the event information until the portion is located in the log. Still another feature involves reading a record from the log; identifying a call code within the record; and retrieving the record only if the call code corresponds to the particular call. The feature of retrieving a portion of the event information further comprises retrieving one or more records that each contain an event identifier referring to one or more events.

In another feature, displaying an analytical report further comprises identifying an event and reporting analytical information concerning the event, in which the analytical information is selected so as to report one or more potential performance problems in the interactive speech application.

According to another feature, storing a log further comprises, for each of the selective actions mentioned above, storing a record that comprises one or more pairs of keywords and associated values. The keywords each comprise an event code associated with a particular one of the selective actions. The associated values each comprise a description of one of the selective actions.

According to still another feature, the method further comprises storing one or more sets of audio information, in which each of the sets of audio information is associated with one or more utterances by one of the callers. Each of the sets of audio information is also associated with one of the tasks represented in the log.

In another feature, while displaying the analytical report, and upon retrieving event information from the log for one of the tasks that is associated with one of the sets of audio information, the method involves audibly replaying such audio information, pausing the displaying of the analytical report and determining whether to replay such audio information an additional time.

The invention also encompasses a computer data signal in the form of a carrier wave that carries instructions configured according to the foregoing steps and features. The invention also involves an apparatus for carrying out the foregoing steps, as described below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for improving performance of an interactive speech application is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

In the preferred embodiment, the invention provides a method of improving performance of an interactive speech application. One aspect of the invention is an interactive approach or mechanism that can replay a complete phone call carried out between a caller and an interactive speech application and display accompanying data analyzing the results of the interaction.

Figure 1A:
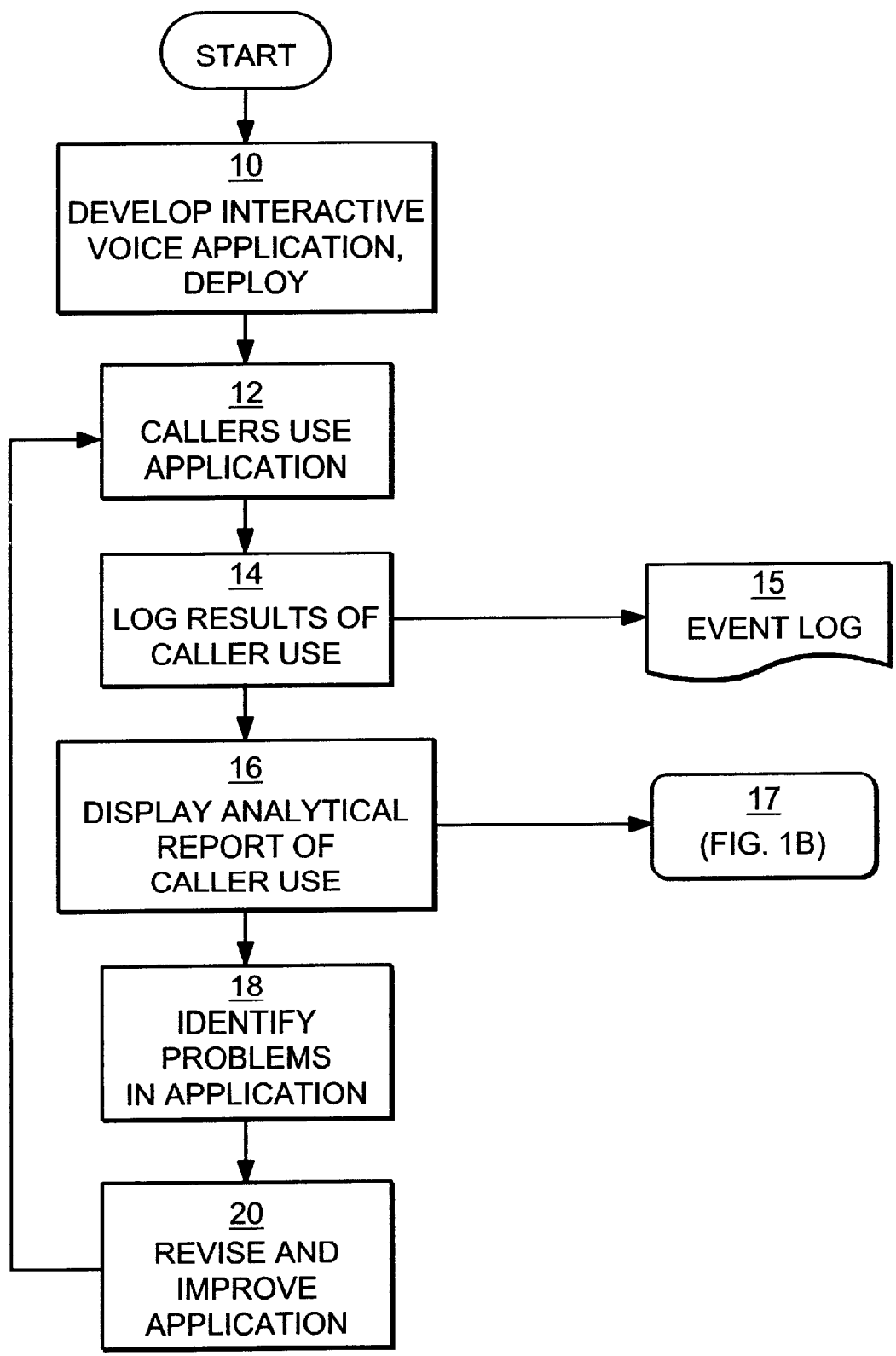
FIG. 1A is a flow diagram of a process of improving performance of an interactive speech application.

FIG. 1A is a flow diagram that illustrates a preferred embodiment of a method of improving performance of an interactive speech application.

In block 10, the interactive speech application is initially developed and deployed. The application may implement a call routing service, an automated attendant service, a fax-on-demand service, or any other desired application. Block 10 may involve the steps of executing a development environment such as DialogModules™, interconnecting one or more program components, running the completed program, debugging it, and deploying the completed and debugged application to callers in a live production environment. In this context, a person who writes or develops the application is called a "developer" or "user" and a person who calls the completed application to carry out some task with it is called a "caller."

In block 12, one or more callers use the interactive speech application, for example, by calling a telephone number associated with the application and interacting with the application to receive information, process transactions, or connect a call to a desired party.

In block 14, results of the caller interactions or uses are logged. Block 14 may involve having the application, or a module or component of the application, writing an event log 15 that contains information about how the application executed.

In block 16, a user or developer of the application may display an analytical report of the caller interactions or uses. For each utterance of the caller, a user of the mechanism disclosed herein can view the name of each prompt given to the caller and optionally listen to the prompt, listen to the caller's utterance, examine the results and scores returned by a speech recognizer integrated into the application, and see the action performed by the application in response to the utterance. This mechanism enables the user to identify one or more problems in the application, as shown by block 18. By replaying a few phone calls, a user of this approach very rapidly can understand whether callers are satisfied with operation of the application. The user can also diagnose any user-interface problems based on the information provided by this approach.

The user may then revise and improve the application, as indicated by block 20. The process of block 10 through block 20 may be repeated as often as desired or necessary to improve and tune performance of the application.

OPERATIONAL OVERVIEW

The preferred embodiment comprises an interactive computer program that replays a previously recorded phone call involving a calling party and an interactive speech application. The interactive computer program is called "ShowCall™" and is preferably executed from a command-line prompt of an operating system that is executed by a computer system optimized for use in speech applications. The interactive speech application runs on the same computer system under control of the operating system.

INVOCATION AND ARGUMENTS

Preferably, the "ShowCall" program may be executed with the following invocation:

>showcall -dir<directoryName> -all 3<logFileName> in which "-dir" is an optional argument, "-call" is an optional argument, and "<logFileName>" is a required argument.

The optional "-dir" argument specifies the directory where audio data is stored and defaults to the current directory. For example, the "ShowCall" program may be invoked with the command line >showcall -dir c:\audio_data event.log in which case the program will obtain audio data from a directory named c:\audio_data and will read call information from an event log file named event.log.

The optional "-call" argument specifies which call in the event log file to start. If no-call argument is supplied in the command line, then the "ShowCall" program will display information for the first call represented in the event log file. The call number can be obtained from a separate "listcall" program, if desired, as described below.

The <logFileName> argument identifies a previously stored event log file that contains call information.

PROCESS OF OPERATION

Figure 3:
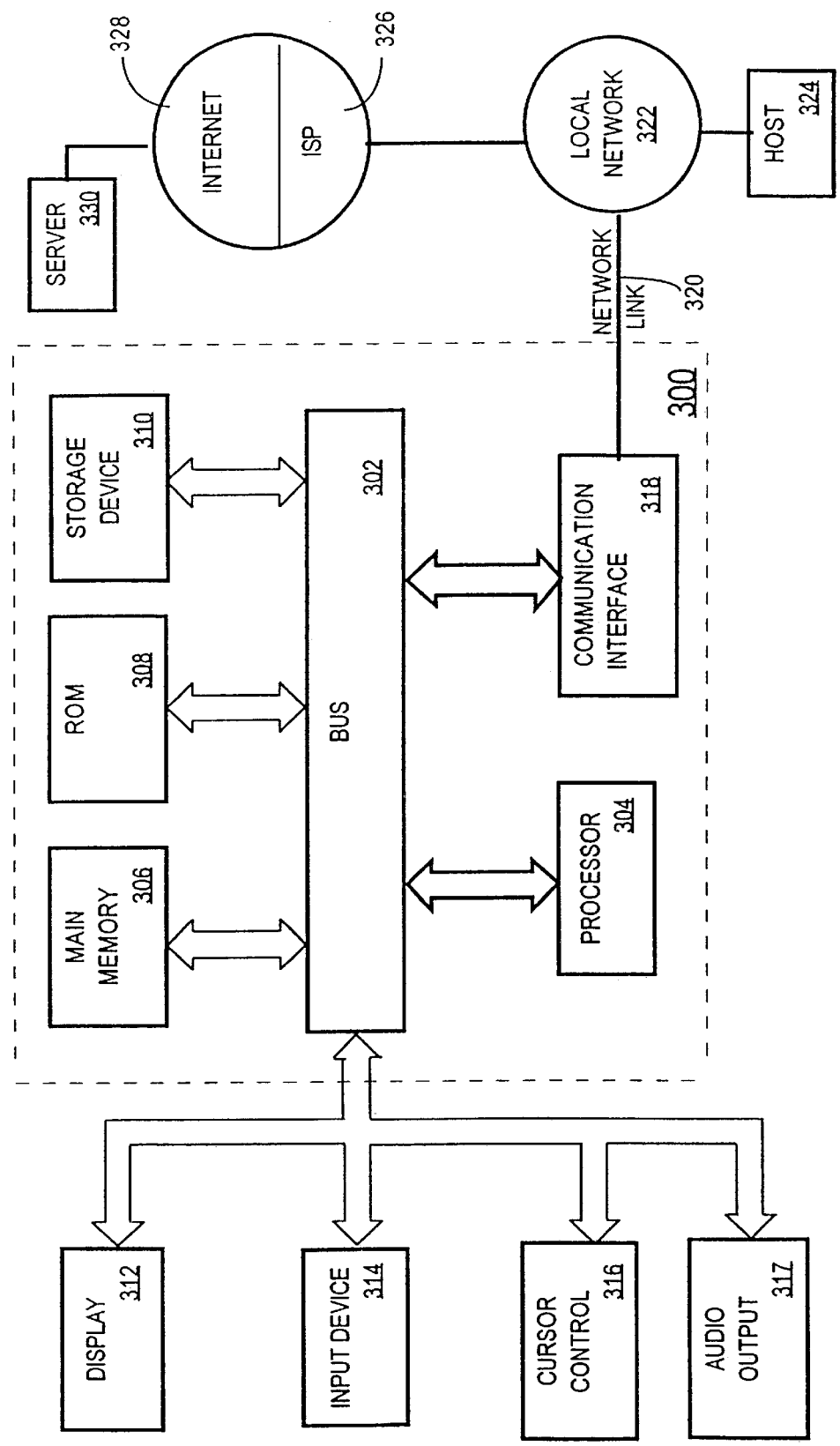
FIG. 3 is a block diagram of a computer system with which the invention may be carried out.
Figure 4:
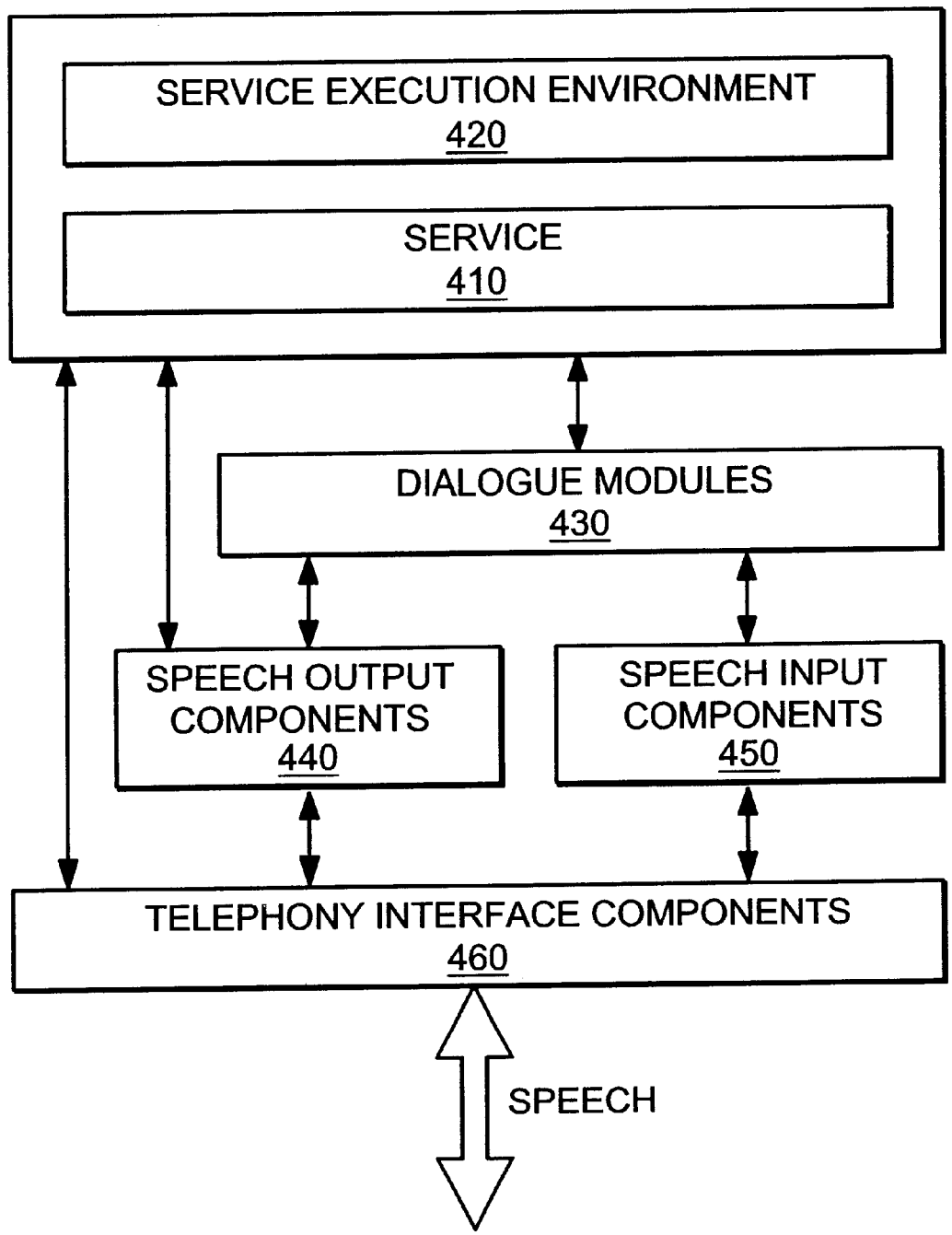
FIG. 4 is a block diagram of a software execution environment with which the invention may be carried out.

FIG. 1B, FIG. 2A, FIG. 2B, FIG. 2C, and FIG. 2D are flow diagrams of a preferred process of displaying, playing, and reporting information about a pre-recorded call carried out between a caller and an interactive speech application. An example of the output displayed by the process, for a hypothetical interactive speech application and call, is set forth in Table 1 below. The process of FIG. 1B, FIG. 2A, FIG. 2B, FIG. 2C, and FIG. 2D preferably is implemented as one or more computer programs that are executed by a computer system that is used for application development purposes and is equipped with audio reproduction equipment. The computer system includes software or hardware that can audibly play back a digitized audio file. An example of a computer system that can be used is shown in FIG. 3. An example of a software execution environment that can be used to execute and control an interactive speech application or Service is shown in FIG. 4. The process of FIG. 1B, FIG. 2A, FIG. 2B, FIG. 2C, and FIG. 2D may be implemented within or as a component of Service Execution Environment 420 or Dialog Modules 430.

Figure 1B:
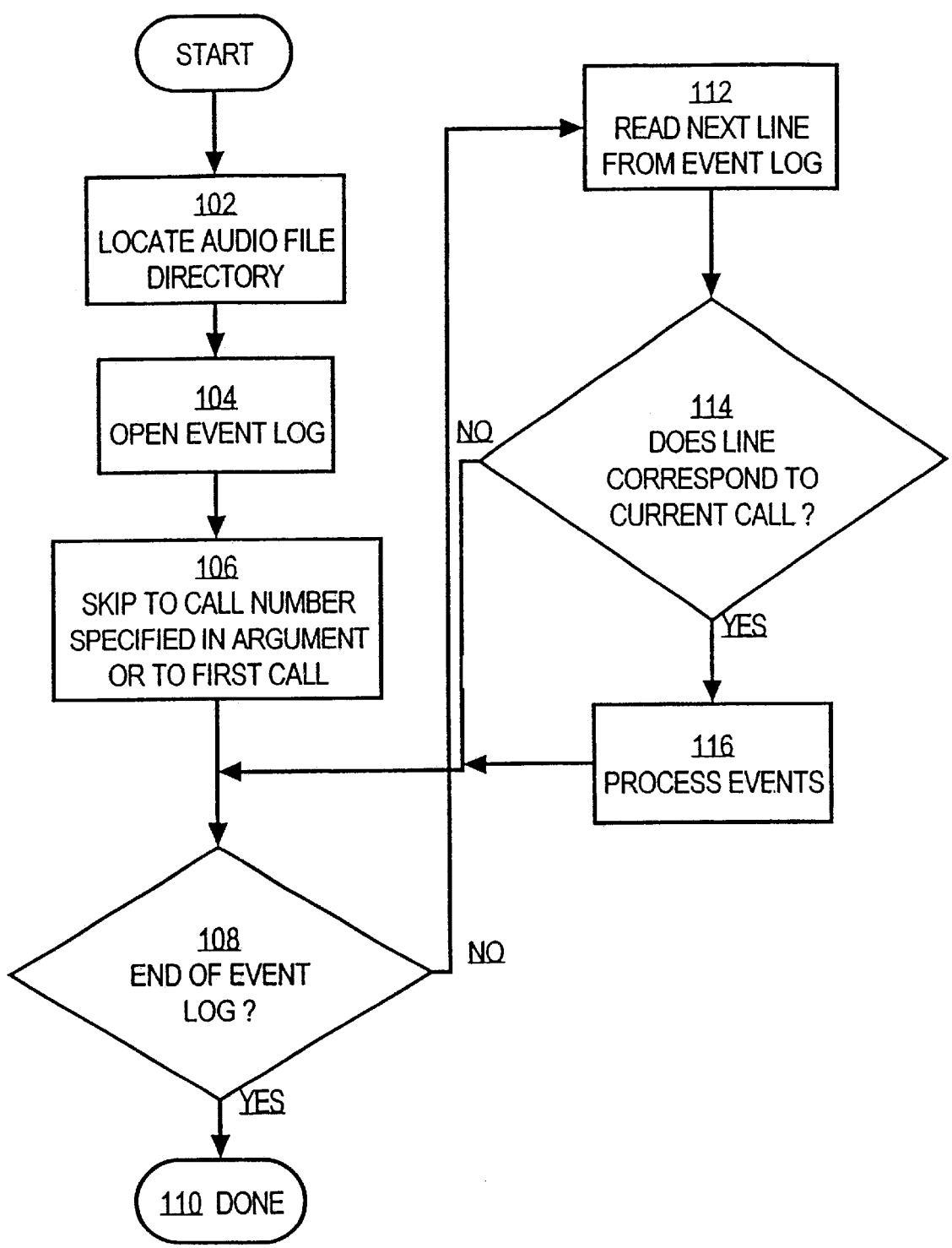
FIG. 1B is a flow diagram of a process of displaying information about a pre-recorded call carried out using an interactive speech application.

Referring first to FIG. 1B, the process locates a directory, on a computer system on which the process is executing, that contains one or more sets of stored audio information. Each set of stored audio information may comprise, for example, an audio file. The audio file stores data representing audible prompts generated by the interactive speech application and responses spoken by the caller during the call. Preferably, block 102 involves the steps of checking the command-line invocation of the program to determine whether the user of the program specified a particular audio directory. If a specific audio directory has been specified, then the process locates the audio information in that directory. Otherwise, by default the process uses the "current" directory as defined by the operating system executed by the computer system.

An event log file is opened, as indicated by block 104. Block 104 may also involve the step of identifying a version designation of the event log file, to ensure that the process is operating with a compatible version of the event log file.

The event log file may store information representing one or more calls. Each call is uniquely identified by a call number. Accordingly, as shown by block 106, the process then reads the event log file and skips to information in the event log file that represents a particular call as identified by a particular call number. The call information may correspond to a call number specified by the user in the command-line invocation of the program. Alternatively, block 106 involves locating call number "1" in the event log file. In the preferred embodiment, a particular call number is located by reading lines of the event log file and searching for a "ALTsvst" event code (i.e., an event code corresponding to the start of the service or application) associated with a value of "1" or the call number specified by the user. Event codes and event code values are described further below. The process then returns to the top of the event log file.

Referring to Table 1, the text "Processing log file: //labrea/D/INTV/DAT/altslee.log" shown in the Table may be displayed as part of block 104 or block 106. The text "Using call directory:," followed by a directory name, may be displayed as part of block 102. The text "Call started on Aug. 6, 1998 at 17:09:51.516 on CHANNEL 1" may be displayed as part of block 106. Of course, the specific information in this message represents a particular hypothetical call, and the text displayed in a working embodiment will represent another specific call.

The process tests whether the end of the event log file has been reached, as shown by block 108. Of course, the test of block 108 will have a NO or FALSE result immediately after the process completes block 106.

In that case, control is passed to block 112, in which the process reads the next line from the event log file. In block 114, the process determines whether the current line of the event log file corresponds to the current call. In the preferred embodiment, each line of the event log file stores a time value, channel value, event value, and CPU identifier values. The process can associate a particular line of the event log file with a particular call by matching the channel value in that line to the channel value associated with a call.

If the current line of the event log file does not correspond to the current call, then control is passed to block 108 in which the end-of-file test is repeated. In effect, this causes the process to move to the next line of the event log file. If the current line does correspond to the current call, then control is passed to block 116, in which the event represented by the current line is processed.

FIG. 2 is a flow diagram showing details of the processing preferably carried out in block 116. Generally, block 116 involves selecting events that are represented in the event log file and may represent sources of potential problems in the interactive speech application, and selectively reporting information about such events to the user. In this way, the user may isolate and identify the potential problems, and then modify the application to correct the problems.

In block 118, the process tests whether the current line of the event log file contains a Start Of Call event. A Start Of Call event indicates that the interactive speech application is starting to handle a new call. If such an event is found in the current line, then the process displays any values associated with the Start Of Call event that are present in the event log file, as shown in block 120. Preferably, the process displays a call number value, time of call value, and channel value. In this context, "display" is used broadly and means to visually display on a computer display device, print on a printer, record in a data file, or otherwise show or report in a manner that can be perceived by a human user.

In block 122, the process tests whether the current line of the event log file contains a Start Of Module event. In the preferred embodiment, a Start Of Module event indicates that the interactive speech application that recorded the event log file is entering the logical flow of a DialogModule™. In other embodiments, the Start Of Module event may indicate that the interactive speech application is entering the logical flow of a subroutine, method, or other element of the application. In response, as shown by block 124, the process displays an elapsed time value, the name of the module or element, and the type of the module or element. The elapsed time value indicates the amount of time that has elapsed from the start of the current call until entry into the module or element. Referring again to Table 1, the text "Starting Dialog Task Name: TESTALPHANUM (type=ALNM)" is an example of what is displayed at block 124.

When ShowCall is used in an interactive speech application development system that uses DialogModules™, it has been found useful for ShowCall to generate a marker each time that the event log file indicates that interactive speech application has entered a DialogModule. Accordingly, in the preferred embodiment as shown by Table 1, ShowCall displays a double line of hyphen characters ("-") whenever the event log file contains a Start Of Module event.

In block 126, the process tests whether the current line of the event log file contains a Start of Prompt event. A Start of Prompt event indicates that the interactive speech application is starting to play an audible prompt to the calling party.

If such an event is found in the current line, as shown in block 128, the process displays an identifier value that uniquely identifies the prompt ("Prompt ID"), the name of the prompt, and the voice set that will be used when playing the prompt. Referring to Table 1, the text "Playing prompt:__ UNKNOWN" is an example of what is displayed at block 128.

After the process carries out the steps of block 120, block 124, or block 128, the process returns control to block 116, as indicated by block 130.

Figure 2A:
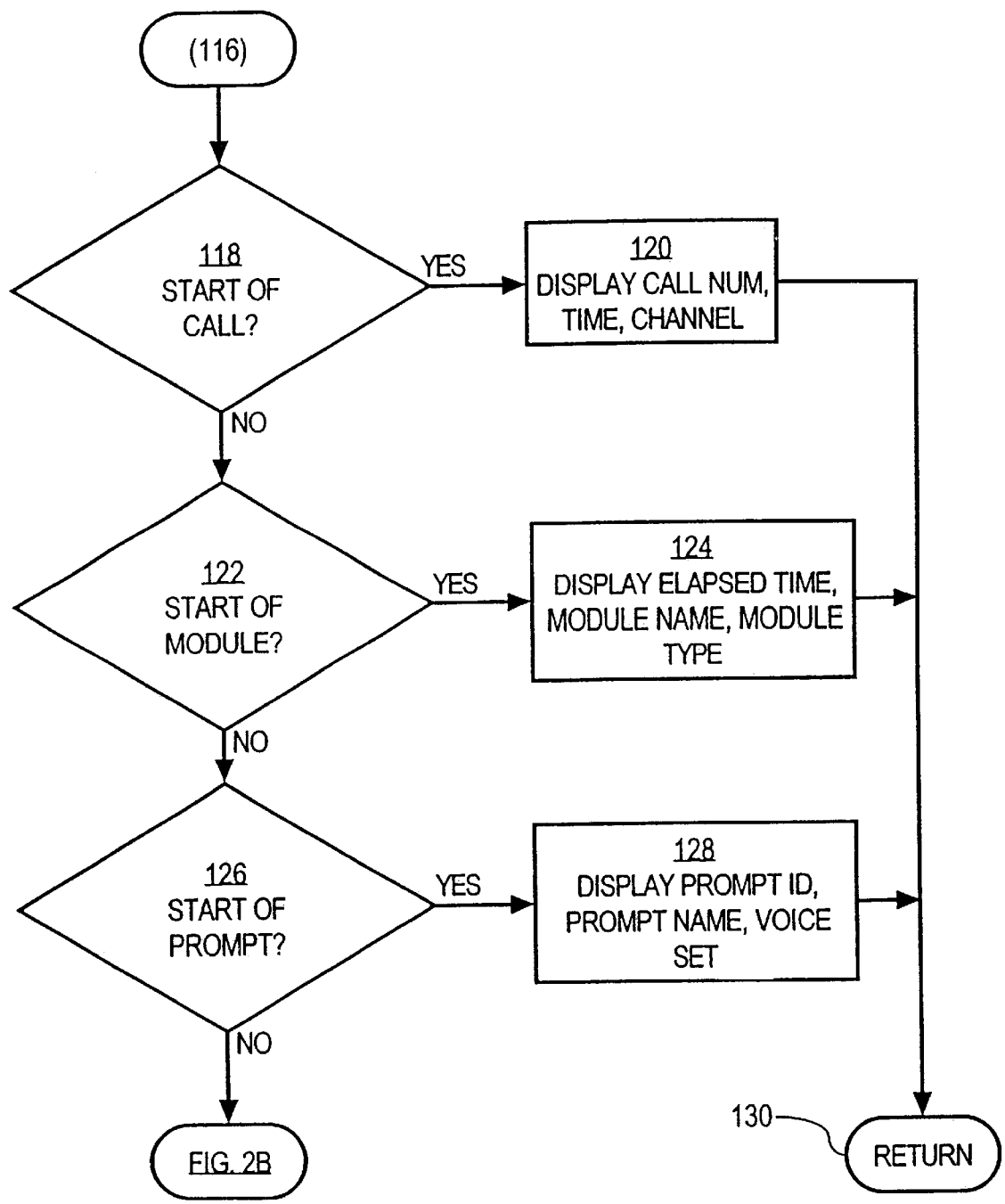
FIG. 2A is a flow diagram of a process of carrying out an event processing aspect of the method of FIG. 1.
Figure 2B:
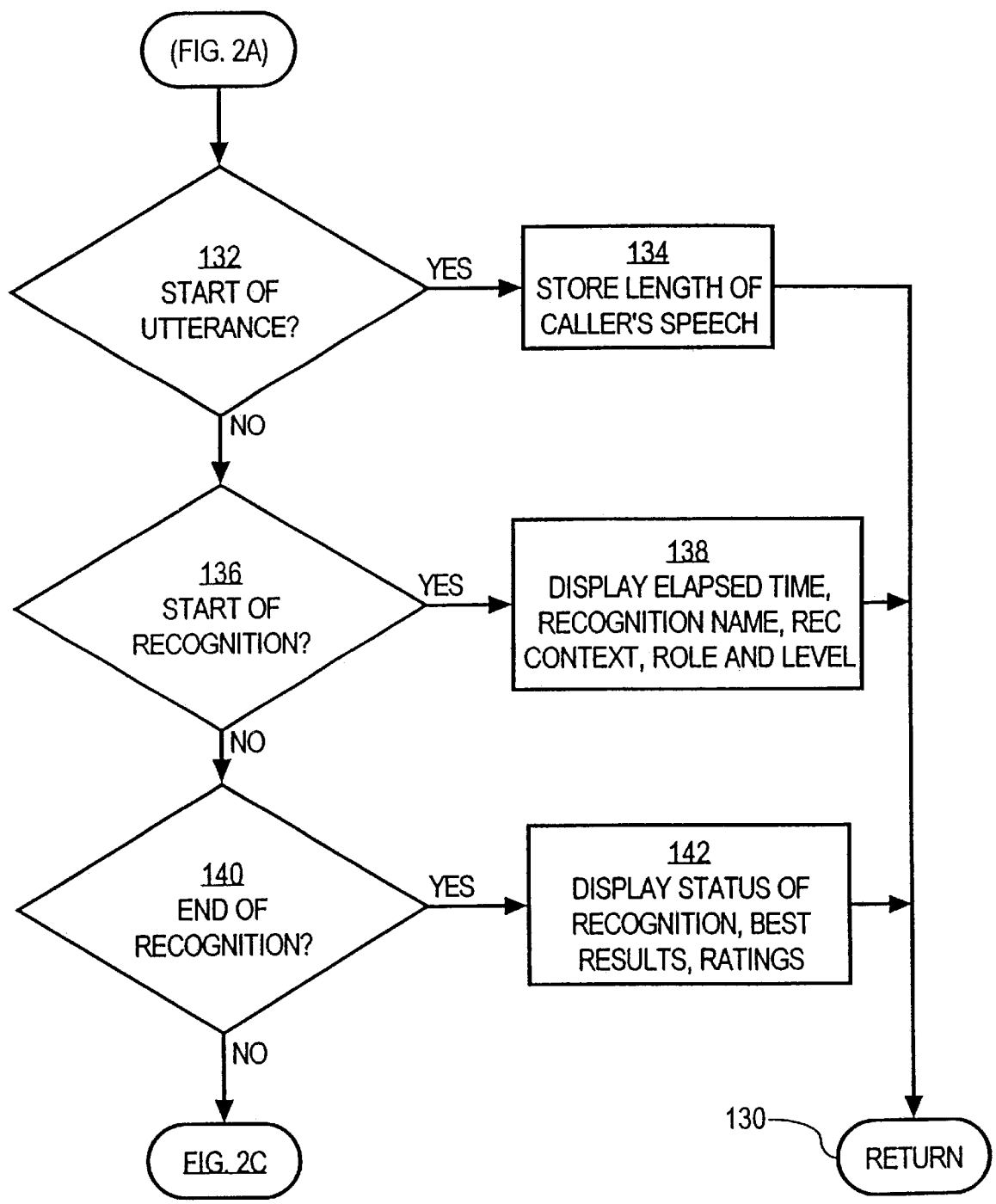
FIG. 2B is a flow diagram of further steps in the process of FIG. 2A.

Referring now to FIG. 2B, if the tests of block 118, block 122, and block 126 are all FALSE, control is passed to block 132 in which the process tests whether the current line contains a Start of Utterance event. A Start of Utterance event indicates that the interactive speech application is starting to receive and record audio information representing a word or other utterance that is being spoken by the caller. In response, a value representing the length of the caller's speech, in milliseconds, is obtained from the event log file by the process and stored in memory for later use.

In block 136, the process tests whether a Start of Recognition event is present in the current line of the event log file. A Start of Recognition event indicates that the interactive speech application is starting to carry out a speech recognition operation on an utterance by the caller. In response, as shown in block 138, the process displays an elapsed time value, a recognition name value, a recognition context value, and values identifying the role and level in the recognition process. The elapsed time value represents the amount of time that has occurred in processing the module up to the current point. The recognition name value identifies the current recognizer process. The recognition context value identifies a name of the current recognition context. The role value indicates what aspect of recognition is being carried out, such as "collection" of speech, "confirmation," "disambiguation" of a response, "fallback," etc. In Table 1, the text "Recognizing: ALTECH_ALPHANUM" is an example of what is displayed at block 138.

In block 140, the process tests whether a End Of Recognition event is present in the current line of the event log file. A End of Recognition event indicates that the interactive speech application is ending a speech recognition operation on an utterance by the caller. In response, as shown in block 142, the process displays a value representing the status of the recognition. If the recognition operation was successful, then the process displays the top two best results of recognition, including both raw and translated texts, and confidence and in-vocabulary rating values for each of the two results. The recognition status value has the values described below in the section entitled "Event Log File Format." In Table 1, the text "N-BEST 0: Recognized: Start (Conf=489) (invc=421)" is an example of what is displayed at block 142.

Figure 2C:
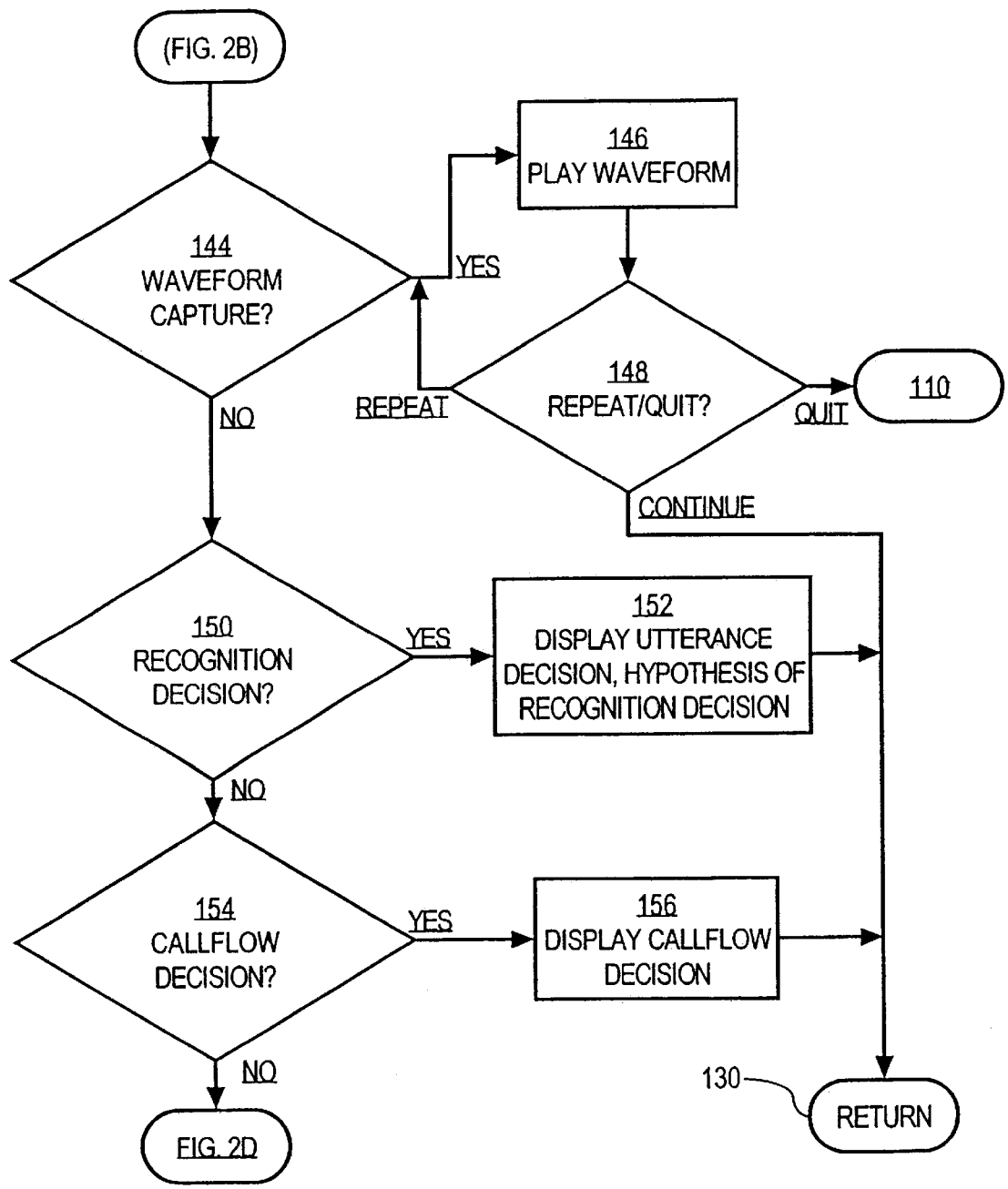
FIG. 2C is a flow diagram of further steps in the process of FIG. 2A.

Referring now to FIG. 2C, if the tests of block 132, block 136, and block 140 are all FALSE, then control is passed to block 144 in which the process tests whether the current line contains a waveform capture event. A waveform capture event occurs when the interactive speech application has captured audio information from the caller. Each waveform capture event is associated with a set of audio information that contains a digital representation of one or more utterances by a caller. For example, an audio file contains a digitized recording of words spoken by a caller, stored in $\mu$-law recording format. The words may be those spoken by the caller in response to a prompt that is captured live from the call connection by an analog-to-digital converter under control of the interactive speech application.

As shown in block 146, the process causes the computer system to play back the waveform associated with the waveform capture event that is identified in block 144. An advisory message may be displayed. For example, as shown in Table 1, the text "Playing ./00001.1.ulaw" is an example of what may be displayed in block 146.

The process then prompts the user whether to repeat playback of the waveform, as shown in block 148. Block 148 may involve the steps of displaying or printing a prompt, such as Repeat: [y]/n (q to quit)?

and accepting a responsive entry from the keyboard. If the user enters "y", then control is passed back to block 146, in which the process replays the waveform. Thus, audio information associated with a particular call event is replayed in association with information describing the event. Accordingly, a developer can analyze the performance of an interactive speech application in conjunction with particular prompts and speech responses that are generated by or recorded by the application in actual operation. For example, the developer can examine the effect of a particular prompt on a subsequent caller response, or test speech recognition or disambiguation functions.

If the user enters "n", then control is passed to block 130 in which the event processing routine, represented broadly by block 116, terminates. Optionally, the process may accept a response of "q", and in response, control is passed to block 110 to terminate the process.

In block 150, the process tests whether the current line of the event log file contains a Recognition Decision event. A Recognition Decision event occurs when a module or element of the interactive speech application is carrying out a decision about the meaning of an utterance. A Recognition Decision always occurs for each utterance, even if the utterance is ambiguous or not. The Recognition Decision states the decision of the DialogModule for the current utterance. For example, it states whether the recognizer had a high enough confidence that it accepted the utterance, or it felt it needed to confirm the utterance. As shown in block 152, the process displays a value representing the utterance decision, and one or more values expressing the hypothesis or basis used for the recognition decision.

In block 154, the process tests whether the current line of the event log file contains a Call Flow Decision event. Generally, a Call Flow Decision occurs when the interactive speech application must decide which logical path to pursue among several logical paths that are available within the application or a module or element of the application. For example, a Call Flow Decision is a decision made by the DialogModule that states the current state of the DialogModule. Thus, if the DialogModule was properly able to recognize the utterance, then the Call Flow Decision would be "finish". However, if the recognition failed, the DialogModule's Call Flow Decision would be to "retry" and collect the primary data again. Other Call Flow Decisions can also be user-defined events that represent other decisions outside of the DialogModules. For example, at a menu within a banking application, a caller may say "checking account balance" at which point the application will branch down the appropriate logical path to look up and relay the requested information to the caller. In response, as shown by block 156, the process displays one or more values that describe the call flow decision that is made.

Figure 2D:
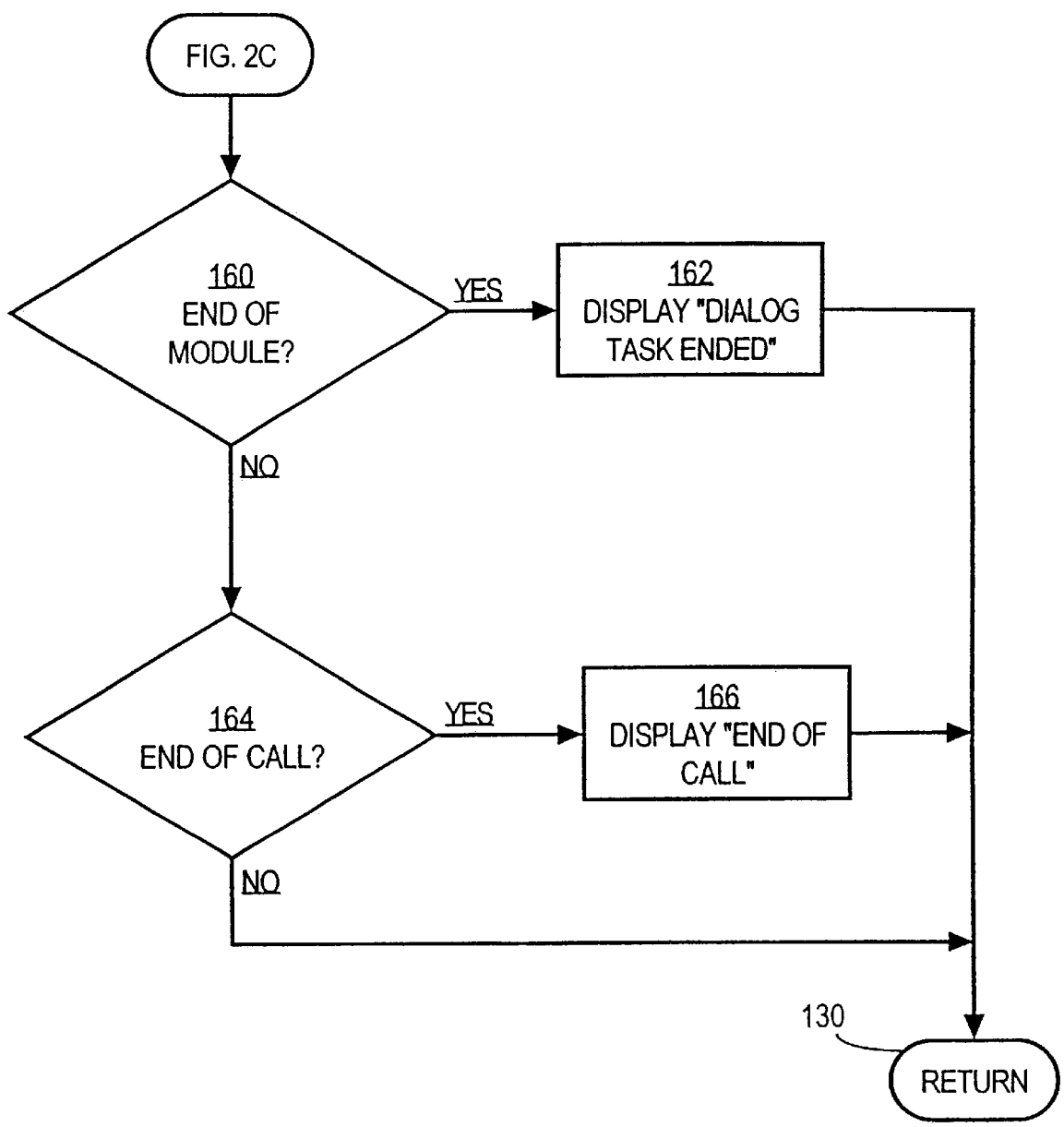
FIG. 2D is a flow diagram of further steps in the process of FIG. 2A.

Referring now to FIG. 2D, in block 160 the process tests whether the current line of the event log contains an End of Module event. An End of Module event signifies that a Dialog Module or other element of the interactive speech application has completed processing. In response, as shown in block 162, the process displays a message such as "Dialog task ended" or "Ending Dialog Task," as shown in Table 1.

In block 164, the process tests whether the current line of the event log contains an End of Call event. An End of Call event signifies that a particular call is finished. In response, as shown in block 166, the process displays a message such as "End of call."

In block 110, the process closes the event log and terminates.

Events are identified in the event log file by a token, such as "ALTsvst," followed by one or more values. In one embodiment, the event log file contains non-sequential listings of events originating from different call channels. Therefore, information that corresponds to different channels will overlap. As a result, information for different calls is interleaved within the event log file. To compensate for this, the process keeps track of the current call, as well as where the next call starts in the event log file. Such tracking may be carried out, for example, as follows. At block 106, when the current line does not correspond to the call number requested by the user, the current location within the event log file is stored. At block 166, the process moves to the stored location by re-setting the current location within the event log file to the stored location identifier. In this way, the process moves to the next line within the event log file that corresponds to the next call.

TABLE 1

UTTERANCE DISPLAY FORMAT

Showcall
Processing log file: //la-brea/D/INTV/DAT/altslee.log
Using call directory:
Call started on 08-06-1998 at 17:09:51.516 on CHANNEL 1.
--------------------------------------------------
--------------------------------------------------
Starting Dialog Task Name: TESTALPHANUM (type = ALNM).
    Playing prompt: _UNKNOWN.
    Playing prompt: _UNKNOWN.
    Recognizing: ALTECH_ALPHANUM.
    N-BEST 0: Recognized: Start (Conf = 489) (invc = 421)
        Raw text = Start
    N-BEST 1: Recognized: Hang_up (Conf = 236) (invc = 424)
        Raw text = Hang_up
    Playing ./00001.1.ulaw.
    Repeat: [y]/n (q to quit)?n
    Playing prompt: _UNKNOWN.
Ending Dialog Task
--------------------------------------------------
--------------------------------------------------
Starting Dialog Task Name: TESTALPHANUM (type = ALNM).
    Playing prompt: _UNKNOWN.
    Playing prompt: _UNKNOWN.
    Recognizing: ALTECH_ALPHANUM
    N-BEST 0: Recognized: Resume (Conf = 816) (invc = 239)
        Raw text = Resume
    N-BEST 1: Recognized: Increment (Conf = 132) (invc = 19)
        Raw text = Increment
    Playing ./00002.1.ulaw.
    Repeat: [y]/n (q to quit)? n
    Playing prompt: _UNKNOWN.
Ending Dialog Task
--------------------------------------------------

IDENTIFYING CALLS IN AN EVENT LOG FILE

In the preferred embodiment, a separate call listing program ("listcall") is provided to enable a user to locate and play calls in the middle of a large event log file. The call listing program displays a summary of all calls in an event log file. In a preferred embodiment, "listcall" is invoked as follows:

>listcall <event log filename>

In response, "listcall" displays a line for each call. Each line includes a call number, date, start time, and channel number, in the format shown in Table 2. To use "ShowCall" for a particular call, a user may refer to the "listcall" listing and then invoke "ShowCall" using the appropriate call number in the -call argument.

TABLE 2

CALL LISTING FORMAT

| Call # | Date | Beg. Time | Channel |
|---|---|---|---|
| 1 | 03-05-1998 | 14:21:28.07 | 10 |
| 2 | 03-05-1998 | 14:22:35.88 | 10 |
| 3 | 03-05-1998 | 14:22:48.34 | 11 |
| 4 | 03-05-1998 | 14:23:11.38 | 10 |
| 5 | 03-05-1998 | 14:23:18.50 | 11 |
| 6 | 03-05-1998 | 14:24:33.35 | 10 |
| 7 | 03-05-1998 | 14:25:46.94 | 10 |
| 8 | 03-05-1998 | 14:27:05.66 | 10 |
| 9 | 03-05-1998 | 14:28:14.87 | 10 |

EVENT LOG FORMAT

The preferred process operates on data saved from previous caller interactions with an interactive speech application. When running, an application can save a log of events that occurred during its execution as well as the audio data of a caller's speech.

Preferably, the performance tuning process described above operates in conjunction with a modular development environment in which event logging may be turned on or off. To enable event logging, a user sets an ALTSLEE_LOG_FILE configuration parameter to a filename representing a file where the user wants event data to be saved. To enable audio data to be saved, the user sets an ALTSLEE_WAVE_CAPTURE parameter to ALL, which causes the system to save all data. Alternatively, the wave capture parameter may be set to FAIL, to only save failed data. The user may also set an ALTSLEE_WAVE_PREFIX parameter to the directory where the user wants the data to be written.

When event logging is active, the interactive speech application writes data to non-volatile storage, such as disk, at a rate of approximately 5 Kbytes per minute of phone call. The application writes audio data in 8-bit $\mu$-law format, at the rate of 8,000 samples per second of speech. An average application stores about 72 Kbytes per minute of a call, if all the audio data is saved.

Preferably, each event log file consists of one or more "event records" terminated by newline characters. Each event record contains one or more keyword/value pairs, or "tokens", separated by the "|" character. Keywords are separated from their values by the "=" character. The first "=" character encountered, scanning left to right within a token, delimits the keyword and value; the value may contain additional "=" characters. If a keyword or value contains "|" characters, they are quoted by inserting an additional "|" character to form the sequence "||". Keywords may not contain the "=" character.

The maximum size of an event record is 10 kilobytes.

The event log provides the following tokens automatically for each event:

| Keyword | Value Description |
|---|---|
| TIME | Time—the time the event was written, in the format YYYYMMDDhhmmssmmm. |
| CHAN | Channel—the session identification name passed to AllocateDM(). On InterVoice, this is an integer corresponding to the channel being used. |
| EVNT | Event code (see below). Event codes are limited to 8 characters; longer event names are truncated. Event codes may have a prefix such as "ALT". |
| UCPU | User CPU—the current running value of "user" CPU time consumed from the start of the current call. This value is reported in milliseconds. The start time is marked from when AllocateDM() is called. |
| SCPU | System CPU—the current running value of "system" CPU time consumed from the start of the current call. This value is reported in milliseconds. The start time is marked from when AllocateDM() is called. |

In each record, the TIME, CHAN, and EVNT tokens are logged first, followed by any event-specific tokens, and finally the UCPU and SCPU tokens. All time-related tokens log times in millisecond units.

The following tokens are defined for specific events. Detailed descriptions of each appear below. By convention, all event codes are lowercase (apart from the "ALT" prefix), and all keywords are uppercase.

ALTsvst—Service Start. The ALTsvst event is logged at the start of a call, via the AllocateDM( ) subroutine.

ALTsvnd—Service End. The ALTsvnd event is logged when a call completes, via the FreeDM( ) subroutine.

ALTdtst—Dialog Task Start. The ALTdtst event is logged when a Dialog Task begins execution.

| Keyword | Value Description | |
|---|---|---|
| DMTP | Dialog Module Type—one of the following: | |
| | ALNM | Alphanumeric |
| | CURR | Currency |
| | DATE | Date |
| | DIGT | Digits |
| | ILST | ItemList |
| | PHON | Phone |
| | SPEL | Spelling |
| | VMNU | VoiceMenu and DigitsMenu |
| | YSNO | YesNo |
| | ZIP | ZipCode |
| DTNM | Dialog Task Name as specified in the Service configuration file and in the Dialog Module Subroutine. | |
| HIST | Unique name for history logging from the subroutine entry form | |

ALTdtnd—Dialog Task End. The ALTdtnd event is logged whenever a Dialog Task completes. There is always one of these events for every Dialog Task Start.

| Keyword | Value Description | |
|---|---|---|
| TSTT | Task Status—one of the following: | |
| | Confirmed | The task was completed successfully and confirmed to be correct by the caller. |
| | Success | The task was completed successfully, but the result was not confirmed. |
| | Command | Command returned. |
| | DTMF | DTMF returned to application. |
| | Failure | After exhausting all configured retries and fallbacks, no valid result was obtained. |
| | Hungup | The caller hung up during the task. |
| | System Error | A resource or other failure occurred before the task could be completed. |
| | Halted | |
| | Out of Memory | |
| | Fatal System Error | |
| TRTT | Task Result—the result (string value) returned by the DialogModule. Only returned in the case of Confirmed or Success; absent for all other return values. | |

The following tokens summarize the Dialog Task errors.

| Keyword | Value Description |
|---|---|
| NUMT | Number of timeouts |
| NUMR | Number of retries |
| NUML | Number of no-answer or low-confidence recognitions. Does not appear for YesNo modules. |
| NUMW | Number of wrong answer recognitions. Does not appear for YesNo. |
| NUMC | Number of confirmations. Does not appear for YesNo. |
| NUMN | Number of N-Best backups. Does not appear for YesNo. |
| WDIS | Whether disambiguation was used. Appears only for ItemList. |
| WSPL | Whether spelling was used. Appears only for ItemList. |

ALTprst—Prompt Start. The ALTprst event is logged when a Dialog Task requests that a prompt be played to the caller.

| Keyword | Value Description |
|---|---|
| PRID | Prompt Id (i.e., InterVoice message number) |
| PRNM | Prompt name-logical name of the prompt played as specified in the Prompt configuration file. |
| VSET | Voice set name (required to uniquely identify the prompt file) |

ALTprst—Recognition Start. The ALTprst event is logged as soon as the recognition engine begins listening for barge-in or an utterance.

| Keyword | Value Description |
|---|---|
| RCNM | Context name as specified in the configuration file. |
| ROLE | The context "role". One of the following:<br>Collection — The original collection for this dialog task.<br>Confirmation — Confirmation context.<br>Disambiguation — Disambiguation context.<br>Fallback — Spelling fallback context. |
| LPNM | Identifies which time through the context this is. On each different iteration, the probabilities for individual words may be altered. Possible values are: 'Initial', 'Timeout1', 'Timeout2', . . ., 'Retry1', 'Retry2', . . . |

ALTutst—Utterance Start. The ALTutst event is logged as soon as the recognition engine detects that the caller is speaking. It is only logged if speech is detected.

ALTrctm—Recognition Timings. The ALTrctm event is logged by the recognition engine when recognition timing results are available for an utterance.

| Keyword | Value Description |
|---|---|
| BTIM | Begin Speech Time—Milliseconds from when the recognition started (approximately tbe time of the ALTrcst event) until start of speech was detected. |
| BRGN | Barged-In—Y if caller barged in while a prompt was playing; N otherwise. |
| SSTM | Start-of-Speech Time—Milliseconds of silence after the previous prompt completed before the caller began speaking. If the Dialog Module did not play the previous prompt, this timer starts at the later of when the Dialog Task started or when it detected silence on the outgoing channel. Present only if BRGN is N. |
| EOST | End Of Speech Time—a timestamp, relative to the time of the ALTutst event, corresponding to when the end of caller speech was detected. |
| EODT | End Of Data Time—a timestamp, relative to the time of the ALTutst event, corresponding to the arrival of the last piece of data from the system hardware. |
| EOFPT | End Of Forward-Pass Time—a timestamp, relative to the time of the ALTutst event, corresponding to when the forward-pass Viterbi search is finished. |
| EOMRLT | End of Master Recognition Loop Time—a timestamp, relative to the time of |

-continued

| Keyword | Value Description |
|---------|-------------------|
|  | the ALTutst event, corresponding to the completion of the Viterbi search and the system hardware cleanup. |
| EORT | End of Recognition Time—a timestamp, relative to the time of the ALTutst event, corresponding to completion of the recognition task. |
| BORT | Begin of Recognition Time—a timestamp, relative to the time of the ALTutst event, corresponding to when a recognition resource was first available to begin processing caller speech. |
| BOPS | Begin of Processed Signal—a timestamp, relative to the point where speech is detected in the incoming signal, corresponding to the start of caller speech. Note that this timestamp is always negative, since speech is always detected some time after it actually begins. |
| EEOS | Estimated End of Speech—a timestamp, relative to the point where speech is detected in the incoming signal, corresponding to the estimated end of caller speech. The estimated end of caller speech always occurs before the actual end-of-speech is detected, since a certain amount of silence must be seen before the recognition engine can be sure that caller speech is finished. |
| EOPS | End of Processed Signal—a timestamp, relative to the point where speech is detected in the incoming signal, corresponding to the end of the speech samples that are actually processed by the recognition engine. |
| EOSS | End of Speech Signal—a timestamp, relative to the point where speech is detected in the incoming signal, corresponding to the detected end of caller speech. |
| DURS | Speech Signal Duration—duration of speech signal, including Start-of-Speech and End-of-Speech padding. This is the speech that the recognizer actually processes. |
| CPRT | Caller-Perceived Response Time—duration from estimated end of caller speech to end of recognition processing. |

The ALTrctm event is only logged if the recognition status is ok or fail (see the RSTT token described below).

ALTrcnd—Recognition End. This event is logged when recognition results are available for an Utterance. There is always one of these for every recognition start.

| Keyword | Value Description |
|---------|-------------------|
| UTTC | Utterance Count—a count of the number of Utterances processed during this call. |
| RSTT | Recognition Status—one of the following:<br>ok    at least one possible result returned<br>fail    speech detected, but no possible results returned<br>time    no caller speech detected before start-of-speech timer expired<br>maxs    utterance duration was greater than the allowed maximum<br>abrt    aborted by a callback<br>stop    recognizer was halted by application<br>err    a resource or other retryable failure occurred before recognition could be completed<br>serr    a fatal system error occurred; no more recognition will succeed until process restarted |
| NBST | Number of results—Count of N-Best results returned. Returned only for status of ok or fail. |
| RDEC | Recognition decision upon exit of dialog task. Although the recognizer returns one or more answers, the DialogModule decides whether or not to accept the answers based on predefined confidence score criteria. This logs the result of that decision. One of the following:<br>accept    Answer accepted without confirmation<br>reject    User rejected all confirmations<br>confirm    Answer accepted after confirmation<br>fail    No result returned |

The following tokens are returned for each of the N-Best results, up to a maximum of the event record size limit, in the ALTrcnd event record:

| Keyword | Value Description |
|---|---|
| RSLT | Result—ASCII string corresponding to phrase recognized as a possible match to utterance. This is after "canonicalization" and synonym mapping. |
| RAWT | Raw Text—ASCII string corresponding to the actual text recognized, before any post-processing. |
| CONF | Match Confidence—An indication of how confident the recognizer is that the result is correct, assuming that the utterance is valid in the vocabulary of the context at all. Values range from 1 to 999, where higher numbers indicate higher confidence. Unlike the Raw Score, these values are roughly comparable across contexts. |
| INVC | In Vocabulary Confidence—An indication of how much more confident the recognizer is that the result is correct versus that it is outside the vocabulary of the context. Values range from 1 to 999, where higher numbers indicate higher confidence. Unlike the Raw Score, these values are roughly comparable across contexts. |
| RAWS | Raw Score—the raw confidence score for the result (−32767 to 32768); higher numbers for a single context indicate higher confidence, but scores are not comparable across contexts. |

ALTdtut—Dialog Task Utterance Decision. The fundamental block within each DialogModule is a question followed by one or more confirmations. The ALTdtut event logs the results during this process. This shows decisions made internal to the execution of a dialog task.

| Keyword | Value Description |
|---|---|
| DCSN | Utterance decision. A list of the values and their meanings appears below. Those items with an 'x' also set the HYPO token.<br>certain     x     Accepted item with high confidence<br>accepted     x     Accepted item without confirming<br>confirmed     x     User confirmed item during confirmation<br>rejected     x     User rejected item during confirmation<br>command     x     User exited confirmation saying a command<br>failed            Could not confirm utterance |
| HYPO | The confirmation value. |

ALTdtcf—Dialog Task Call Flow Decision. This event describes major decisions made during the intra-DialogModule callflow. The exact values of this token may differ depending on the specifics of the callflow. For example, only ALTdmItemList may disambiguate or apply fallback.

| Keyword | Value Description |
|---|---|
| DCSN | Intra-DialogModule callflow decision. A list of the current values and their meanings appears below.<br>finish             Data collected; ending module<br>retry              Repeat same section<br>disambiguate    The recognized item requires disambiguation<br>fallback          Recognition attempts failed, resorting to fallback<br>max retries      Maximum retries exceeded, exiting<br>max timeouts    Maximum timeouts exceeded, exiting<br>aborting         Event or error (see ALTdtnd for reason) |

ALTwcap—Waveform Captured. This event is logged whenever an application saves a waveform to a file for off-line analysis as a result of the current settings (ALL waveforms, FAILED only, or NONE). This event immediately follows the Recognition End event during which the waveform was captured.

| Keyword | Value Description |
|---------|-------------------|
| FNUM | File Number—a combination of a five digit number (with leading zeros) and the session name, appended to the end of the ALTSLEE_WAVE_PREFIX registry value, comprising the file name in which the waveform data was stored |

The following example describes an event log file that may be generated and stored for a hypothetical interactive speech application. The example application uses a processing module that handles item lists. Assume that the example application uses an AVF ("ALTech Vocabulary File") file as shown in Table 3, and implements or is an element of an auto-attendant system. In the AVF file, the word 'bill' is ambiguous, and two similar words appear. This example shows only the tokens pertaining to dialog task decisions; other tokens, such as service start, prompt start, etc. are omitted for clarity of this example.

TABLE 3

| AVF FILE CONTENTS | |
|---|---|
| bill | 224 |
| bill | 223 |
| bill o'farrell | 223 |
| bill ledingham | 224 |
| billy ledingham | 224 |
| phil | 303 |
| will | 223 |

Assume also that each time the caller is asked for information, one or more timeouts may occur. As long as the maximum number of timeouts is not reached, the user is re-prompted.

Assume now that while executing for a hypothetical call, the example application generates the following audible prompts and events shown in Table 4. In Table 4 through Table 7, the first column ("Prompt") indicates the audible prompt that is played to a caller by the interactive speech application. The second column ("Caller") indicates the speech said by the caller in response to the prompt and recorded by the application. The third column ("Event Log Entry") represents the information stored in the event log file by the application in response to the caller's utterance.

TABLE 4

--EXAMPLE EVENT LOG ENTRIES--PART 1

| PROMPT | CALLER | EVENT LOG ENTRY |
|--------|--------|-----------------|
| Welcome to Altech. Please say the name of the person with whom you wish to speak? | | |
| | <silence> | ALTrcst\|ROLE=Collection\|LPNM=Initial ALTrcnd\|RDEC=fail |
| I couldn't hear you. Please say the name of the person again. | | |
| | <garbled> | ALTrcst\|ROLE=Collection\|LPNM= Timeout1 ALTrcnd\|RDEC=reject ALTdtut\|DCSN=failed ALTdtcf\|DCSN=retry |

At this point, the application or task needs to make a decision. Should it attempt to collect understandable audio against, resort to a fallback strategy, or exit the current module with a failure flag set? Assume that collection of audio is re-attempted. The event log will contain the information set forth in Table 5.

TABLE 5

--EXAMPLE EVENT LOG ENTRIES--PART 2

| | | |
|---|---|---|
| Please say the name one more time. | | |
| | bill | ALTrcst\|ROLE=Collection\|LPNM=Retry1 |
| | | ALTrcnd\|RDEC=confirm |
| I think you said <prompts/ PrinceOFHeck.ulaw>. Is that correct? | | |
| | <garbled> | ALTrcst\|ROLE=Confirmation\|LPNM= Initial |
| | | ALTrcnd\|RDEC=fail |
| I couldn't tell whether you said 'yes' or 'no'. I think you said <prompts/PrinceOfHeck.ulaw>. Is that correct? | | |
| | no | ALTrcst\|ROLE=Confirmation\|LPNM= Retry1 |
| | | ALTrcnd\|RDEC=accept |
| | | ALTdtut\|DCSN=reject\|HYPO=bill |
| Maybe it was <prompts/ WilliamOFarrell.ulaw>? | | |
| | no | ALTrcst\|ROLE=Confirmation\|LPNM= Initial |
| | | ALTrcnd\|RDEC=accept |
| | | ALTdtut\|DCSN=reject\|HYPO=bill o'farrell |
| | | ALTdtcf\|DCSN=retry |

At this point, the example application that it heard something, but the user rejects each choice during confirmation. Again, the application needs to make a decision about what to do next. Assume that it elects to retry, but the recognition context is different than during the initial collection. Since the user has rejected 'phil' and 'will', these options are disallowed from the original vocabulary. The event log file will contain the information set forth in Table 6.

TABLE 6

--EXAMPLE EVENT LOG ENTRIES--PART 3

| | | |
|---|---|---|
| Please say the name of an ALTech employee now. | | |
| | bill | ALTrcst\|ROLE=Collection\|LPNM=Retry2 |
| | | ALTrcnd\|RDEC=accept |
| | | ALTdtut\|DCSN=certain\|HYPO=bill |
| | | ALTdtcf\|DCSN=disambiguate |

This time, the application recognized 'bill' with a very high confidence value. The vocabulary item "bill" is ambiguous, so the application proceeds with disambiguation. The event log file will contain the information set forth in Table 7.

TABLE 7

--EXAMPLE EVENT LOG ENTRIES--PART 4

| | | |
|---|---|---|
| We have more than one <prompts/Bill.ulaw>. Which do you mean? | | |
| | bill o'farrell | ALTrcst\|ROLE=Disambiguation\|LPNM= Initial |
| | | ALTrcnd\|RDEC=accept |
| Did you say <prompts/BillO.ulaw>? | | |
| | yes | ALTrcst\|ROLE=Confirmation\|LPNM= Initial |
| | | ALTrcnd\|RDEC=accept |
| | | ALTdtut\|DCSN=confirmed\|HYPO=bill o'farrell |

The application proceeds smoothly through disambiguation and now has a unique, unambiguous result. The application must now decide what to do next. In a more complex module or application, the application might move to the next step and ask something like 'Who should I say is calling?'. Since the current task is an Item List task, however, the extension 223 is returned from the module and the call is transferred. The following information is stored in the event log file:

ALTdtcf|DCSN=finishALTdtnd|TSTT= Confirmed|TRTT=223|...

CALL BROWSER

In an alternate embodiment, the invention provides a call browser. Preferably this embodiment is carried out in the context of a development environment for interactive speech applications. The development environment displays an interactive speech application under development in the form of one or more interconnected modules. A user may select a module, for example, by moving a mouse-operated cursor to the module and double-clicking on a mouse button. In response, the call browser displays information on contexts, enables the user to listen to rejected utterances, and offers other functions.

The invention may also be integrated as a component of a larger application that provides reporting capabilities. For example, it may be designed to work in conjunction with a report writer such as Crystal Reports available from Seagate Software. Using the report facilities, the user is able to summarize the application data, apply filters for various conditions, and "drill down" on particular pieces of data. The user can then run ShowCall against the resulted calls that have been selected by this filtering process. ShowCall may be invoked by highlighting a particular call and then double-clicking using the mouse or by selecting from a pull-down menu In yet another alternate embodiment, the call browser includes one or more agent processes that can read an event log file and make development suggestions to the user. For example, an event process reads an event log file, analyzes its contents, and displays the suggestion "reduce the high-confidence threshold value at module X" or "voice menu choice Y has a higher utterance/execute value than others—you should examine its pronunciation."

DEVELOPMENT SYSTEM CONTEXT

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e. g., y), that allows the device to specify positions in a plane.

Computer system 300 may be coupled via bus 302 to an audio output device 317, which enables the computer system to audibly play speech or other information generated by an interactive speech application or received from a caller who is using the application. For example, audio output device 317 may comprise the combination of a sound card, amplifier and loudspeaker. Other audio equipment that performs equivalent functions may be used.

The invention is related to the use of computer system 300 for improving performance of an interactive speech application. According to one embodiment of the invention, improving performance of an interactive speech application is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for improvement of an interactive speech application as described herein.

The received code may be executed by processor 304 as it is received, and/or stored in storage device 310, or other non-volatile storage for later execution. In this manner, computer system 300 may obtain application code in the form of a carrier wave.

Additional details of exemplary components of a computer system suitable for speech systems are described in G. Pelton, "Voice Processing" (New York: McGraw-Hill, 1993), ISBN 0-07-049309-X, Chapter 8 ("Development Software").

According to one embodiment of the invention, an interactive speech application is developed and executed using software running on a general purpose computer system such as computer system 300. In alternative embodiments, special purpose hardware may be used in place of or in combination with software instructions to implement the invention. Thus, embodiments of the invention are not limited to any specific combination of hardware circuitry and software.

Development System

FIG. 4 is a functional block diagram of a system 400 for developing interactive speech applications. As used herein, a "Service" 410 is a customized interactive speech application developed to perform one or more dialogue tasks to provide a user-defined service. An example of a Service is the application described for receiving and routing an incoming call.

An application developer creates a Service 410 defining a call flow in a runtime Service Execution Environment 420 which may be a default environment provided to the developer or a customized environment created or modified for the specific Service 410. In this embodiment, the Service Execution Environment 420 provides a program function that executes the Service 410, which is configured as a dynamically linked library (DLL).

The call flow of the Service 410 describes its interactive conversation with callers using function calls to one or more "instances" of software modules from the Dialogue Modules 430. The system 400 comprises a plurality of Dialogue Modules, each of which performs a specific speech-processing task. Example tasks include outputting a prompt, identifying the caller's speech as a recognized item of a predefined list, identifying the caller's speech as an affirmative or negative (Yes/No) response, or identifying strings of characters spelled by the caller. In the embodiments described herein, each Dialogue Module is implemented as a generic template that is a function, method, object, or subroutine. A programming language such as C++ may be used.

A developer interconnects instances of the Dialogue Modules to perform dialogue tasks within a Service 410. Each Dialogue Module may use default configuration parameters or may be customized for a specific Service 410. Parameters of a Dialogue Module instance may be customized to, for example, output customized prompts, recognize customized vocabularies in response to prompts, enable or disable specific features, and set a variety of additional parameters.

Dialogue Modules 430 provides an interface between the Service 410 and the Speech Output Components 440 and Speech Input Components 450, which perform functions enabling the system 400 to handle output and input audio signals. By providing the interface, the Dialogue Modules 430 allows a developer to develop a Service 410 without a detailed understanding of the Speech Output Components 440 and Speech Input Components 450, whose functions include outputting prompts to callers and receiving and processing input speech from callers. Any number of Speech Output Components 440 and Speech Input Components 450 may be included in the system 400.

In the embodiment illustrated in FIG. 4, the Speech Output Components 440 output speech prompts (or other audio signals) through the Telephony Interface Components 460. In some cases, the Speech Output Components 440 may simply execute a specified audio file to output prerecorded speech. Alternatively, the Speech Output Components 440 may include a speech synthesis system, such as DECtalk™, a text-to-speech synthesizer that is available from Digital Equipment Corporation for converting text to speech. Commercially available speech synthesizers typically include a pronunciation dictionary and a speech generator to interpret an input text string, determine a pronunciation, and generate and output a speech waveform. Additionally, Speech Output Components 440 may include software to output an audio signal such as a beep when the prompt is finished playing, intended to notify callers that they should begin speaking. The Speech Output Components 440 may also include software to stop the output of a prompt if caller speech is detected, thereby providing "barge-in" detection and handling. Details of barge-in detection and handling are explained, for example, in U.S. Pat.

No. 5,765,130, entitled "Method and Apparatus for Facilitating Speech Barge-In In Connection With Voice Recognition Systems."

The Speech Input Components 450 receive, record, and process incoming speech signals received through the Telephony Interface Components 460 during execution of a Service. Speech Input Components 450 typically include a Speech Recognition Engine such as that provided in SpeechWorks™, available from Applied Language Technologies, Inc. of Boston, Mass., for recording, digitizing, and processing speech input. The Speech Recognition Engine, using additional components such as acoustic models for determining a phonetic representation of an input spoken word, database components for determining possible matches to entries in specified databases accessible to the Engine, and confidence correlation components for determining the confidence in hypotheses of possible matches, generates a textual representation of incoming speech signals received from callers. The Engine has natural language modeling information, such as grammar rules of languages of speech it is intended to recognize.

The Telephony Interface Components 460 include components such as telephony cards providing telephony interface/voice boards for communicating over telephone lines, call channels for handling multiple calls on the telephone lines, an audio player/recorder for outputting prompts to callers and recording incoming speech from callers, and other components as needed to output and receive speech signals to and from callers, as well as software libraries to control the components.

The Service 410, including its Dialogue Module instances and their underlying Speech Output Components 440 and Speech Input Components 450 and Telephony Interface Components 460, operates within the runtime Service Execution Environment 420. As noted above, in this embodiment, the Service 410 is configured as a dynamically linked library (DLL) and is executed by being called by the Service Execution Environment 420 which provides the top level ("main( )") function. Additional software code is provided in a library to handle calls to Dialogue Module instances and other globally used functions.

In general, the Service Execution Environment 420 will invoke the Service 410 at three times: service initialization, service execution (processing incoming calls), and service clean up (after processing calls). Examples of functions the Service Execution Environment 420 can be configured to process include: initializing the telephony interface; initializing the interfaces to the Speech Output Components 440 and Speech Input Components 450 and Dialogue Modules 430; invoking user-provided service initialization routines, if necessary; waiting for an incoming call; determining a telephony channel; invoking user-provided service execution routines; ensuring disconnection of completed calls; and invoking cleanup routines, including user-provided service cleanup routines, Dialogue Module cleanup routines, and hardware/telephony resources cleanup routines.

EXTENSIONS AND VARIATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of reviewing the behavior of an interactive speech recognition application that plays prompts to a caller, that interprets utterance responses from the caller, and that reacts in response, the method comprising the acts of:

causing the speech recognition application to store, in a computer-readable file, event information, including token information identifying prompts played to the caller by the speech recognition application, token information about the utterance responses from the caller, and token information about the reactions of the application to the utterance responses;

in response to a user input, using a computer program to parse the computer readable file to detect token information in the file and to display a formatted report therefrom, wherein the format of the report illustrates a sequence of events occurring during the call and includes controls allowing a user to replay an utterance response so that the user may review the behavior of the speech recognition application including reviewing the utterance response interpreted by the application and including reviewing the reactions thereto by the application.

2. The method of claim 1 wherein the computer-readable file includes event information about calls from a plurality of callers and wherein the act of parsing filters event information to specific calls in response to a user input.

3. The method of claim 2 further comprising the act of displaying a call listing descriptive of a plurality of calls handled by the speech recognition application, wherein each of said calls has caused corresponding event information to be stored in said file, and in response to a user selection of a call from the call listing, causing the filtering act to be performed for said selected call.

4. The method of claim 1 wherein the speech recognition application is constructed from one or more modules of software logic and wherein the event information includes token information identifying the modules used by the speech recognition application when handling a call, and wherein the report illustrates when the modules were used in the sequence of events.

5. The method of claim 1 wherein the token information about the reactions of the application includes information identifying a recognition decision about the meaning of an utterance response as interpreted by the application.

6. The method of claim 1 wherein the execution of speech recognition applications is characterized by a call flow descriptive of the path of logic operations actually executed by the application from a plurality of such paths, and wherein the event information includes token information about call flow decisions.

7. The method of claim 1 wherein the interpretation of an utterance response by the speech recognition application is characterized by context role information, including information identifying whether the application is collecting an original utterance, confirmation context and disambiguation context, and wherein the event information includes tokens about the role information of the speech application.

8. The method of claim 1 wherein the event information includes token information identifying whether the speech recognition application is identifying a barge-in utterance response, wherein a barge-in utterance response is an utterance made by a user before a preceding prompt is completely played to the user, and wherein the report illustrates that the response was a barge-in response.

9. The method of claim 1 wherein the speech recognition application identifies best results when interpreting an utterance response, and wherein the event information includes token information about the N-best results and wherein the report includes information indicative of the N-best results.

10. The method of claim 9 wherein the token information about the N-best results includes match confidence information indicating the confidence that the interpretation is correct.

11. The method of claim 1 wherein the event information about the reactions to the utterance responses includes token information about an utterance decision made by the speech recognition application in reacting to the utterance, wherein an utterance decision token information identifies whether the speech application interpreted the utterance with or without high confidence, and whether the user accepted or rejected a confirmation prompt.

12. A system for reviewing the behavior of an interactive speech recognition application that plays prompts to a caller, that interprets utterance responses from the caller, and that reacts in response, comprising:

logic to cause the speech recognition application to store, in a computer-readable file, event information, including token information identifying prompts played to the caller by the speech recognition application, token information about the utterance responses from the caller, and token information about the reactions of the application to the utterance responses;

logic, responsive to a user input, to parse the computer-readable file to detect token information in the file and to display a formatted report therefrom, wherein the format of the report illustrates a sequence of events occurring during the call and includes controls allowing a user to replay an utterance response so that the user may review the behavior of the speech recognition application including reviewing the utterance response interpreted by the application and including reviewing the reactions thereto by the application.

13. The system of claim 12 wherein the computer-readable file includes event information about calls from a plurality of callers and wherein the parsing logic includes logic to filter event information to specific calls in response to a user input.

14. The system of claim 13 further comprising logic to display a call listing descriptive of a plurality of calls handled by the speech recognition application, wherein each of said calls has caused corresponding event information to be stored in said file, and logic, responsive to a user selection of a call from the call listing, to cause the filtering logic to filter information about the selected call.

15. The system of claim 12 wherein the speech recognition application is constructed from one or more modules of software logic and wherein the event information includes token information identifying the modules used by the speech recognition application when handling a call, and wherein the report illustrates when the modules were used in the sequence of events.

16. The system of claim 12 wherein the token information about the reactions of the application includes information identifying a recognition decision about the meaning of an utterance response as interpreted by the application.

17. The system of claim 12 wherein the execution of speech recognition applications is characterized by a call flow descriptive of the path of logic operations actually executed by the application from a plurality of such paths, and wherein the event information includes token information about call flow decisions.

18. The system of claim 12 wherein the interpretation of an utterance response by the speech recognition application is characterized by context role information, including information identifying whether the application is collecting an original utterance, confirmation context and disambiguation context, and wherein the event information includes tokens about the role information of the speech application.

19. The system of claim 12 wherein the event information includes token information identifying whether the speech recognition application is identifying a barge-in utterance response, wherein a barge-in utterance response is an utterance made by a user before a preceding prompt is completely played to the user, and wherein the report illustrates that the response was a barge-in response.

20. The system of claim 12 wherein the speech recognition application identifies N-best results when interpreting an utterance response, and wherein the event information includes token information about the N-best results and wherein the report includes information indicative of the N-best results.

21. The system of claim 20 wherein the token information about the N-best results includes match confidence information indicating the confidence that the interpretation is correct.

22. The system of claim 12 wherein the event information about the reactions to the utterance responses includes token information about an utterance decision made by the speech recognition application in reacting to the utterance, wherein an utterance decision token information identifies whether the speech application interpreted the utterance with or without high confidence, and whether the user accepted or rejected a confirmation prompt.

* * * * *